(12) United States Patent
Juels

(10) Patent No.: US 7,532,104 B2
(45) Date of Patent: May 12, 2009

(54) LOW-COMPLEXITY CRYPTOGRAPHIC TECHNIQUES FOR USE WITH RADIO FREQUENCY IDENTIFICATION DEVICES

(75) Inventor: Ari Juels, Brookline, MA (US)

(73) Assignee: RSA Security, Inc., Bedford, MA (US)

( * ) Notice: Subject to any disclaimer, the term of this patent is extended or adjusted under 35 U.S.C. 154(b) by 860 days.

(21) Appl. No.: 10/782,309

(22) Filed: Feb. 19, 2004

(65) Prior Publication Data

US 2004/0222878 A1    Nov. 11, 2004

Related U.S. Application Data

(60) Provisional application No. 60/468,200, filed on May 6, 2003.

(51) Int. Cl.
H04Q 1/00 (2006.01)
G05B 19/00 (2006.01)

(52) U.S. Cl. .................... 340/5.61; 340/5.26; 340/10.1; 380/258; 380/270

(58) Field of Classification Search ................ 340/5.61, 340/5.8, 5.1, 5.64, 5.26, 10.1, 426.36, 825.69, 340/572.1; 713/168, 150, 182; 380/258, 380/270; 341/174, 176; 361/171
See application file for complete search history.

(56) References Cited

U.S. PATENT DOCUMENTS

| | | | | |
|---|---|---|---|---|
| 4,928,098 | A * | 5/1990 | Dannhaeuser | 340/5.26 |
| 5,673,034 | A * | 9/1997 | Saliga | 340/5.26 |
| 6,225,889 | B1 * | 5/2001 | Furuta et al. | 340/426.36 |
| 6,340,932 | B1 * | 1/2002 | Rodgers et al. | 340/572.7 |
| 6,724,895 | B1 * | 4/2004 | Turner et al. | 713/168 |
| 6,842,106 | B2 * | 1/2005 | Hughes et al. | 340/5.8 |
| 7,187,267 | B2 * | 3/2007 | Cole | 340/10.1 |
| 7,239,229 | B2 * | 7/2007 | Bauhahn | 340/10.42 |

OTHER PUBLICATIONS

"23 mm Glass Transponder," Radio Frequency Identification Systems, Texas Instruments, 1 page, Dec. 2001.
"12 mm Wedge Transponder," Radio Frequency Identification Systems, Texas Instruments, 1 page, Dec. 2001.
M. Jakobsson et al., "Security Weaknesses in Bluetooth," 16 pages, 2001.
"Read/Write Transponder," Atmel, 22 pages, Apr. 2003.
S.A. Weis et al., "Security and Privacy Aspects of Low-Cost Radio Frequency Identification Systems," Proceedings of the First International Conference on Security in Pervasive Computing, 12 pages, 2003.
S.A. Weis, "Security and Privacy in Radio-Frequency Identification Devices," Master of Science Thesis, MIT, pp. 1-79, May 2003.

(Continued)

Primary Examiner—Edwin C Holloway, III
(74) Attorney, Agent, or Firm—Ryan, Mason & Lewis, LLP

(57) ABSTRACT

Cryptographic techniques are provided having a complexity level which permits their implementation in inexpensive radio frequency identification (RFID) tags or other RFID devices. In an RFID system comprising one or more RFID devices and at least one reader that communicates with the devices, a plurality of pseudonyms is associated with a given one of the RFID devices. The RFID device transmits different ones of the pseudonyms in response to different reader queries, and an authorized verifier is able to determine that the different transmitted pseudonyms are associated with the same RFID device.

31 Claims, 2 Drawing Sheets

OTHER PUBLICATIONS

A. Juels et al., "Squealing Euros: Privacy Protection in RFID-Enabled Banknotes," Financial Cryptography, Springer-Verlag, 18 pages, 2003.

P. Golle et al., "Universal Re-encryption of Mixnets," Springer-Verlag, 14 pages, 2002.

D.L. Brock, "The Electronic Product Code (EPC): A Naming Scheme for Physical Objects," White Paper, MIT-AUTOID-WH-002, MIT Auto-ID Center, http://www.autoidcenter.org., pp. 1-21, Jan. 2001.

Auto-ID Center, Technical Report, "13.56 MHz ISM Band Class 1 Radio Frequency Identification Tag Interface Specification: Recommended Standard, Version 1.0.0," MIT-AUTOID-TR-011, MIT Auto-ID Center, http://autoidcenter.org, pp. 1-31, Feb. 2003.

S. Garfinkel, "An RFID Bill of Rights," Technology Review, p. 35, Oct. 2002.

S.E. Sarma et al., "RFID Systems, Security & Privacy Implications," White Paper, MIT-AUTOID-WH-014, MIT Auto-ID Center, pp. 1-16, Nov. 2002.

S.E. Sarma et al., "Radio-Frequency Identification: Security Risks and Challenges," RSA Laboratories, CryptoBytes, vol. 6, No. 1, pp. 1-32, Spring 2003.

D.W. Engels, "HF Identity Tag Action Group: Scope and Deliverables," Technical Report, MIT-AUTOID-TR-020, MIT Auto-ID Center, pp. 1-5, Jul. 2003.

M.G. Reed et al., "Protocols Using Anonymous Connections: Mobile Applications," In Security Protocols, Proceedings of the 5th International Workshop, Springer-VerlagLNCS 1361, 11 pages, 1997.

\* cited by examiner

US 7,532,104 B2

LOW-COMPLEXITY CRYPTOGRAPHIC TECHNIQUES FOR USE WITH RADIO FREQUENCY IDENTIFICATION DEVICES

RELATED APPLICATIONS(S)

The present application claims the priority of U.S. Provisional Patent Application Ser. No. 60/468,200, filed May 6, 2003 and entitled "Privacy and Authentication in Low-cost RFID Tags," the disclosure of which is incorporated by reference herein.

The present application is also related to U.S. patent application Ser. No. 10/673,540, filed Sep. 29, 2003 and entitled "Method And Apparatus For Selective Blocking Of Radio Frequency Identification Devices," now issued as U.S. Pat. No. 6,970,070, which is commonly assigned herewith and incorporated by reference herein.

FIELD OF THE INVENTION

The present invention relates generally to radio frequency identification (RFID) tags or other types of RFID devices, and more particularly to cryptographic techniques that can be implemented within the limited computational and storage capabilities of such devices.

BACKGROUND OF THE INVENTION

A conventional RFID tag typically comprises an integrated circuit transceiver capable of transmitting a unique serial number or other identifier to a nearby reader in response to a query from the reader.

An example of an inexpensive RFID tag providing such basic functionality is described in S. E. Sarma, "Towards the five-cent tag," Technical Report MIT-AUTOID-WH-006, MIT Auto ID Center, 2001. This RFID tag transmits a static, 64-to-128-bit identifier on receiving a reader query.

An example of a more advanced RFID tag is the TK5552 transponder, commercially available from Atmel Corporation, of San Jose, Calif., U.S.A. This tag provides a small user-programmable memory, with a storage capacity on the order of about 1000 bits, as well as other enhanced functionality relative to the more basic RFID tag previously described, but at a substantially higher cost.

It is expected that ongoing RFID tag development efforts will continue to produce cost and size reductions, which should result in a rapid proliferation of RFID tags into many new areas of use. The impending ubiquity of RFID tags, however, poses a potentially widespread threat to consumer privacy. The simplest conventional RFID tag will typically broadcast its unique identifying information to any nearby reader. The movements of a given consumer or other user can therefore be readily tracked by simply monitoring the RFID tags in goods carried by or otherwise associated with that user. The above-cited U.S. patent application Ser. No. 10/673, 540 discloses techniques for selective blocking of RFID tags, in a manner that protects consumer privacy.

Another significant problem that can arise in conventional RFID tags of the type described above is that such tags can be difficult to authenticate. For example, these and other RFID tags may be easily cloned by an attacker that has read access, since as previously noted the tags typically broadcast their identifiers in a promiscuous manner to any nearby readers.

As is well known, there are numerous cryptographic techniques that are capable of providing secure authentication between properly-equipped devices. However, such techniques generally require substantial computational and storage resources, well beyond those associated with even an advanced RFID tag such as the above-described Atmel TK5552 transponder. Conventional cryptographic techniques are thus generally far too complex to implement within the limited computational and storage capabilities typical of existing RFID tags.

Accordingly, a need exists for improved cryptographic techniques that solve the above-identified authentication problem without requiring a significant increase in the computational and storage resources, and thus the cost, of the RFID tags.

SUMMARY OF THE INVENTION

The present invention provides low-complexity cryptographic techniques that can be implemented in the limited computational and storage capabilities of typical RFID tags and other RFID devices, allowing such devices to be readily authenticated by a reader or other type of verifier.

The invention may be implemented in an RFID system comprising one or more RFID devices and at least one reader that communicates with the devices.

In accordance with an aspect of the invention, multiple pseudonyms are associated with a given one of the RFID devices, and the RFID device transmits different ones of the pseudonyms in response to different reader queries. An authorized verifier is able to determine that the different transmitted pseudonyms are associated with the same RFID device.

In accordance with another aspect of the invention, an authentication protocol is provided in which the RFID device authenticates itself to a reader or other verifier only after the verifier has authenticated itself to the RFID device. The verifier may authenticate itself to the RFID device by releasing to the RFID device an authentication value, $\beta_i$ unique to a given pseudonym $\alpha_i$ transmitted by the RFID device. Similarly, the RFID device may authenticate itself to the verifier by releasing to the verifier an authentication value $\gamma_i$ unique to a given pseudonym $\alpha_i$ transmitted by the RFID device.

In an illustrative embodiment, the pseudonyms may be stored in the RFID device as an ordered list of pseudonyms. A particular one of the pseudonyms is designated as a current pseudonym and, in response to a given reader query, the current pseudonym is transmitted by the RFID device. After the current pseudonym is transmitted by the RFID device responsive to the given query, a different one of the stored pseudonyms is designated as the current pseudonym, and is transmitted responsive to a subsequent reader query. Thus, over a sufficient number of reader queries, the pseudonym designated as the current pseudonym periodically cycles through the list of pseudonyms.

Alternatively, one or more of the pseudonyms may be generated on an as-needed basis within the RFID device, or may be generated externally to the RFID device.

For additional security, it may be desirable to impose a low query-response rate within the RFID device. This is referred to herein as "throttling" the query-response rate, and may be accomplished, for example, by implementing hardware-based response delays within the RFID device. As another example, a maximum rate at which the RFID device is permitted to respond to reader queries with transmitted pseudonyms may be specified.

The pseudonyms transmittable by the RFID device may be periodically altered responsive to receipt of refresh information in the RFID device from a verifier.

Another aspect of the invention relates to a system comprising at least one device and at least one reader which communicates with the device. In accordance with this aspect of the invention, a plurality of pseudonyms are associated with the device, and different ones of the pseudonyms are transmitted from the device in response to different reader queries of the device. The pseudonyms are determined utilizing an updateable set of one or more one-time pads maintained in the device.

Advantageously, the authentication protocol in the illustrative embodiment involves no computationally-intensive cryptographic operations, and relatively little storage, making it practical for implementation in low-cost RFID tags and other devices. More specifically, the protocol in this embodiment involves operations no more computationally intensive than basic memory management, string comparison, and exclusive-or (XOR).

These and other features and advantages of the present invention will become more readily apparent from the accompanying drawings and the following detailed description.

DETAILED DESCRIPTION OF THE PREFERRED EMBODIMENTS

The present invention will be described herein with reference to an exemplary RFID system in which multiple RFID devices communicate with an RFID device reader. It is to be appreciated, however, that the invention is not restricted to use in this or any other particular RFID system configuration. Moreover, the invention can be implemented in a wide variety of non-RFID systems, each of which may comprise at least one device and at least one reader which communicates with the device. The latter systems may include systems which utilize forms of device-reader coupling other than wireless communication between the device and reader, including wired arrangements involving temporary or permanent physical coupling between the device and reader.

The term "RFID device" as used herein is intended to include an RFID tag or any other type of device configurable for transmission of device-identifying information via radio frequency communications. Although the following description will refer primarily to RFID tags, it is to be understood that the techniques disclosed are more generally applicable to other types of RFID devices. Also, the terms "radio frequency" or "RF" as used herein are not intended to be restricted to any particular frequency range, but are instead intended to be construed more generally so as to encompass any contiguous or non-contiguous arrangement of one or more signal frequencies suitable for supporting wireless communication between at least one device and at least one reader.

The device-identifying information associated with a given RFID device may be a serial number or any other type of identifier. It should be noted that not every identifier in a given set of unique identifiers need have a corresponding realized device.

The term "pseudonym" as used herein is intended to include device-identifying information transmitted by an RFID device, such as an identifier in a given set of multiple identifiers stored or generated in the device, or a portion of an identifier in an embodiment in which portions of an identifier can serve as device-identifying information.

The term "reader" as used herein is intended to include any type of device capable of interacting with an RFID tag or other device so as to receive device-identifying information therefrom.

The term "verifier" refers to any device or other entity that is capable of authenticating one or more devices. A reader is one example of a verifier, although other types of verifiers may be implemented at least in part outside of a reader.

Figure 1:
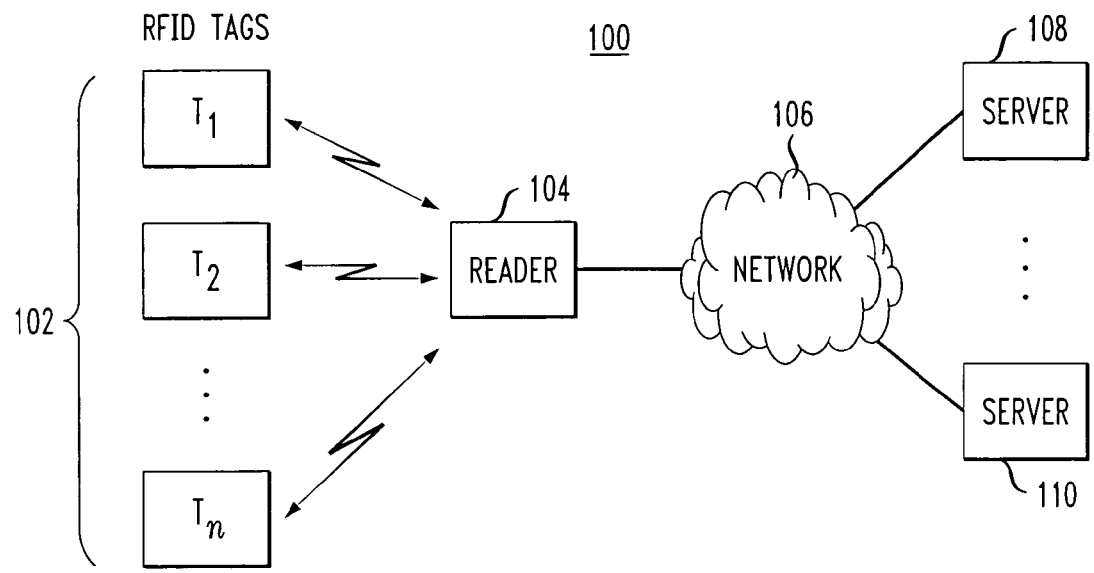
FIG. 1 is a simplified block diagram of an example RFID system in which the present invention is implemented.

FIG. 1 shows an RFID system 100 in which the present invention is implemented. The system 100 includes a number of RFID tags 102, more particularly denoted $T_1, T_2, \ldots T_n$, and an RFID reader 104. The reader 104 communicates with the tags 102 and receives identifying information therefrom, in the form of one or more transmitted pseudonyms, utilizing the techniques of the present invention. The reader 104 is coupled via a network 106 to servers denoted 108, 110.

A given RFID tag 102 in accordance with the invention generally includes circuitry comprising memory, processing logic and an RF transceiver. These elements may be configured in a manner similar to that used in conventional RFID tags, with straightforward modification to implement low-complexity cryptographic techniques as described herein.

One or more of the tags 102 may each comprise a so-called "blocker tag" configured with an ability to block the operation of a singulation algorithm utilized by the reader 104 in order to provide enhanced privacy for a user of the tag, as described in the above-cited U.S. patent application Ser. No. 10/673, 540. The present invention, however, does not require the use of such blocker tags.

The network 106 may represent a global computer network such as the Internet, a wide area network (WAN), a local area network (LAN), a satellite network, a telephone or cable network, or various portions or combinations of these and other types of networks. The servers 108, 110 may be conventional processor-based information processing devices of a type conventionally utilized in conjunction with RFID readers in an RFID system.

The particular number n of tags 102 in the system 100 is purely arbitrary, and the system can be configured to support any desired number of tags. Also, although only a single reader 104 is shown in the figure for simplicity and clarity of illustration, the system will typically include multiple readers. Furthermore, it should be noted that a given reader need not be connected to a network, and may instead operate as a stand-alone device, or may be only intermittently connected to the network.

Figure 2:
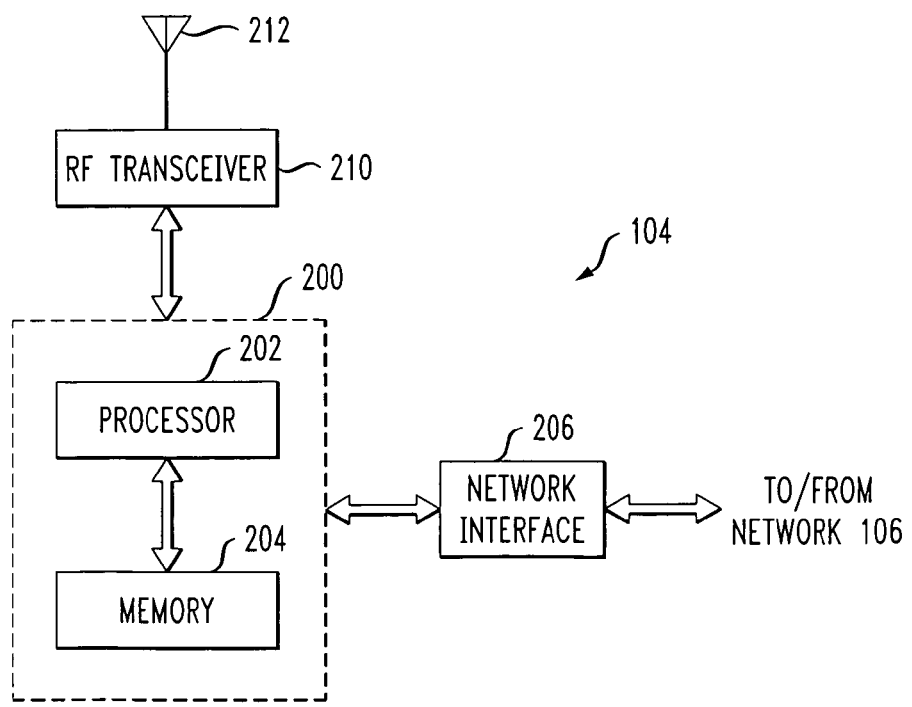
FIG. 2 illustrates one possible implementation of an RFID device reader of the FIG. 1 system.

FIG. 2 shows one possible implementation of the reader 104 of the FIG. 1 system. The reader in this implementation includes a processing block 200, comprising a processor 202 coupled to a memory 204, a network interface 206, an RF transceiver 210, and an antenna 212. One or more of these elements may be implemented in whole or in part as a conventional microprocessor, digital signal processor, application-specific integrated circuit (ASIC) or other type of circuitry, as well as portions or combinations of such circuitry elements. Software programs for controlling the operation of the reader 104 may be stored in the memory 204 and executed by the processor 202.

A typical RFID reader is generally only able to communicate with a single RFID tag at a time. In effect, however, the reader may be viewed as broadcasting a query to all of the tags 102 at once. If more than one tag responds to a query by the reader, the reader detects a collision and executes a singulation algorithm which allows the reader to communicate with the conflicting tags one at a time.

Conventional RFID tag systems typically operate at a frequency of either 13.56 MHz or 915 MHz. Those operating at 915 MHz commonly utilize a tree-walking singulation algorithm, while those operating at 13.56 MHz usually utilize an ALOHA singulation algorithm. Other frequencies, such as 125 kHz and 2.45 GHz, are also used, and employ similar singulation algorithms. Such algorithms are known in the art, and will therefore not be further described herein. The invention can be utilized with a reader incorporating one of these known singulation algorithms, or a reader incorporating another type of singulation algorithm, or any other type of reader, including a reader that does not singulate tags.

Figure 3:
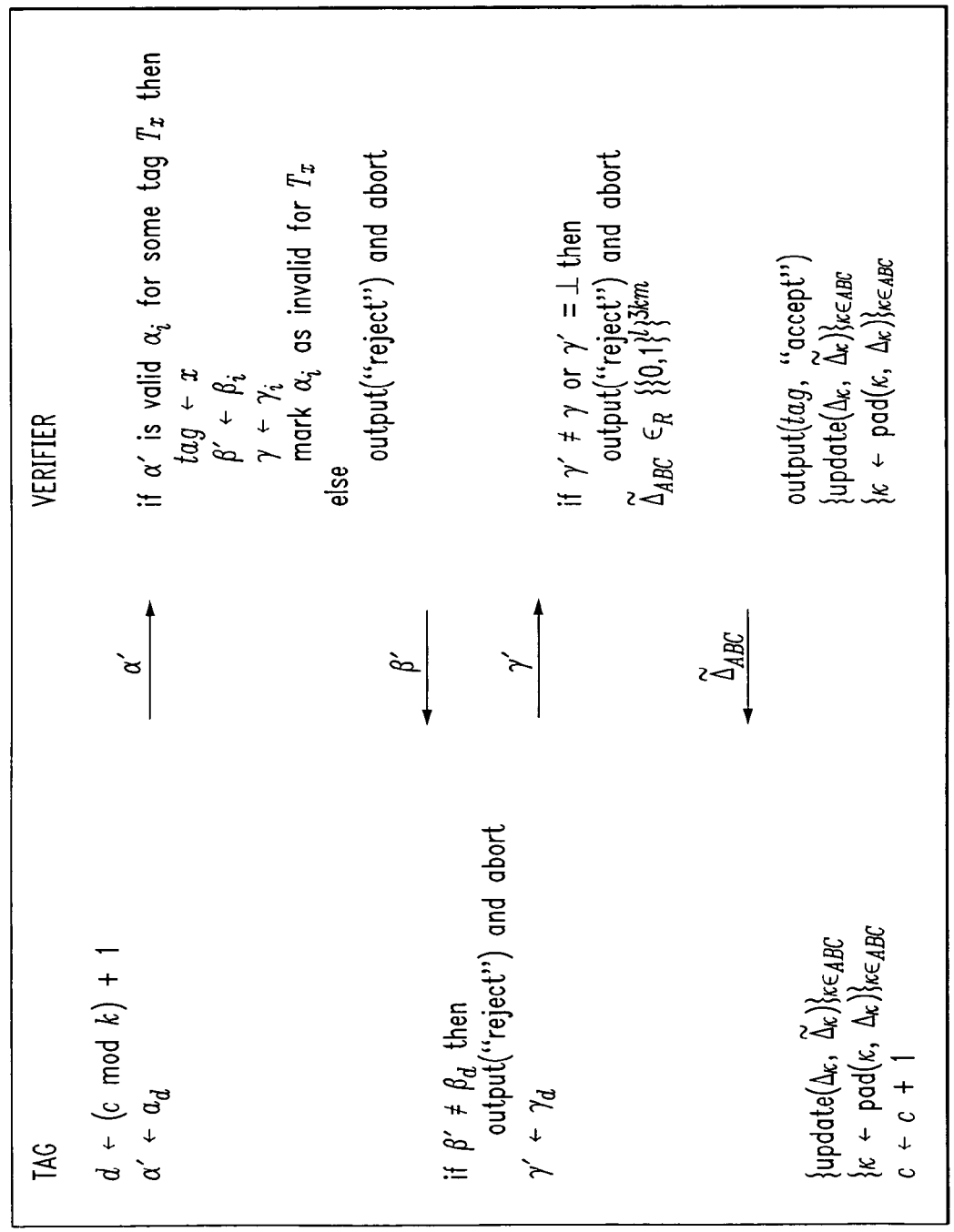
FIG. 3 shows an exemplary authentication protocol utilizable in the FIG. 1 system in an illustrative embodiment of the invention.

In the illustrative embodiment, a cryptographic authentication protocol, to be described in detail in conjunction with FIG. 3, is carried out between one or more of the tags 102 and an entity referred to herein as a verifier. As indicated previously, the verifier in the illustrative embodiment may comprise the reader 104, one or more of the servers 108, 110, or any other entity of the system, as well as portions or combinations of such entities.

A significant advantage of the authentication protocol in the illustrative embodiment is that it involves no computationally-intensive cryptographic operations, and relatively little storage, making it practical for implementation in low-cost RFID tags. As will be described below, the protocol involves operations no more computationally intensive than basic memory management, string comparison, and exclusive-or (XOR).

Generally, the authentication protocol in the illustrative embodiment uses an approach referred to herein as "pseudonym rotation." In this approach, a given RFID tag stores a short list of pseudonyms, with each of the pseudonyms in the illustrative embodiment corresponding, for example, to an identifier of the given tag. Alternatively, the pseudonyms of the list may be generated as needed, either internally or externally to the given tag, or various combinations of storage and generation may be used. Secret splitting techniques, of a type known to those skilled in the art, may be used to avoid storing pseudonyms at a single point of compromise within the system.

In the case of a stored list of pseudonyms, each time the tag is queried by a reader, it transmits the next pseudonym in the list, cycling to the beginning when the list is exhausted. Since the tag is in effect continually changing its transmitted identifiers, it is difficult for an attacker to determine which identifiers are associated with which tags. Many other types of pseudonym rotation arrangements can be used, such as an arrangement in which one or more of the stored pseudonyms are each transmitted multiple times in a row.

An authorized verifier is able to determine that the different transmitted pseudonyms are associated with the same RFID device. By way of example, such a verifier may have possession of (i) the pseudonyms themselves; (ii) seeds, secrets or other information used to generate the pseudonyms; or (iii) hashes of the pseudonyms or other information generated from the pseudonyms. A verifier of the transmitted pseudonyms must have possession of such information in order to be able to determine that each of the transmitted pseudonyms is associated with the same tag.

In the description of the illustrative embodiment, the pseudonyms may be referred to as identifiers or as values, but it should be noted that other types and arrangements of pseudonyms may be used. For example, in an alternative embodiment to be described elsewhere herein, a concatenated set of pseudonyms may be treated as a single, long identifier.

Additional security may be provided in the illustrative embodiment and other embodiments by imposing a low query-response rate in the tag. This is referred to herein as "throttling" the query-response rate, and may be accomplished, for example, by implementing hardware-based delays within the tag in a straightforward manner. As another example, it is possible to specify a maximum rate at which the tag is permitted to respond to reader queries with transmitted pseudonyms. Numerous other techniques may be used to limit the rate at which the tag is permitted to generate responses to reader queries. Of course, when implementing a given throttling technique, care should be taken to ensure that it does not interfere with the normal reading of tags within the system.

Due to its limited storage capabilities, a typical RFID tag can store only a small list of pseudonyms. This issue is addressed in the illustrative embodiment by allowing the list of pseudonyms in a given RFID tag to be refreshed by authorized verifiers. The authentication protocol in the illustrative embodiment thus not only allows a verifier to authenticate a tag, but also allows the tag to authenticate the verifier. This type of authentication protocol is referred to herein as a multiple-flow protocol.

As noted above, the authentication protocol in the illustrative embodiment relies upon rotation by a tag through multiple pseudonyms, which are denoted by $\alpha_1, \alpha_2, \ldots, \alpha_k$. These k pseudonyms, however, do not themselves serve as the sole means of authentication for tags. If a tag authenticated itself to a verifier merely by releasing a value $\alpha_i$, an adversary could clone a tag simply by querying the target tag to obtain $\alpha_i$, and then separately interacting with the verifier using the value $\alpha_i$ to simulate a valid tag. Indeed, this is precisely the type of cloning attack to which conventional RFID tags with static identifiers are particularly vulnerable. In fact, any single-flow protocol is necessarily vulnerable to such an attack.

The authentication protocol in the illustrative embodiment is configured to avoid this type of attack by ensuring that a tag authenticates itself to a verifier only after the verifier has first authenticated itself to the tag. The verifier authenticates to the tag by releasing a verifier-to-tag authentication value $\beta_i$ unique to a given pseudonym $\alpha_i$. Once the verifier has authenticated to the tag, the tag authenticates itself to the verifier by releasing a tag-to-verifier authentication value $\gamma_i$. Like $\beta_i$, this authentication value $\gamma_i$ is unique to an identifier $\alpha_i$. The authentication protocol may thus be viewed as a type of challenge-response protocol, but one that is integrated with the pseudonym rotation feature previously described, and that does not require any intensive computation.

The verifier can update the $\{\alpha_i\}$, $\{\beta_i\}$, and $\{\gamma_i\}$ values in an RFID tag after successful mutual authentication between tag and verifier. This maintains the integrity of the tag over an extended period of time, in the presence of multiple attacks by an adversary. In order to prevent an adversary from eavesdropping on or tampering with the secrets used in this update process, the $\{\alpha_i\}$, $\{\beta_i\}$, and $\{\gamma_i\}$ values are updated using one-time pads that have been transmitted across multiple sessions of the authentication protocol. Thus an adversary that only eavesdrops periodically is unlikely to learn the updated $\{\alpha_i\}$, $\{\beta_i\}$, and $\{\gamma_i\}$ values. Also, an adversary without knowledge of the one-time pads used during the update process cannot, for instance, mount a swapping attack involving the substitution of values from one compromised tag into another tag.

The one-time pad is a simple, classical form of encryption. Generally, if two parties share a secret one-time pad $\delta$, namely a random bitstring of length l, then one party may transmit an l-bit message M secretly to the other via the ciphertext M⊕δ, where ⊕ denotes the XOR operation. It is well known that this form of encryption provides information-theoretic secrecy. Additional conventional aspects of one-time pads are described in A. J. Menezes et al., "Handbook of Applied Cryptography," CRC Press, 1996, which is incorporated by reference herein.

In the illustrative embodiment, the verifier transmits one-time padding data that the tag uses to update the $\{\alpha_i\}$, $\{\beta_i\}$, and $\{\gamma_i\}$ values. An eavesdropper without knowledge of the padding data achieves no knowledge of the updated tag values. Although this procedure does not explicitly involve encryption by means of one-time pads, it is essentially equivalent to encryption. The pads in this embodiment may be viewed as keys used to "encrypt" and thereby update the $\{\alpha_i\}$, $\{\beta_i\}$, and $\{\gamma_i\}$ values.

It should be understood, however, that the invention does not require the use of the one-time pad, and may be implemented using a variety of other forms of encryption.

As noted above, the approach utilized in the illustrative embodiment involves composition of one-time pads across multiple authentication sessions. This has the effect of retaining secrecy in the face of partial adversarial eavesdropping or tampering. Suppose, for instance, that pads from two different verifier-tag sessions are XORed with a given tag value in order to update that value. Then even if an adversary intercepts the pad used in one session, that adversary will learn no information about the updated tag value.

An advantage associated with use of a one-time pad for encryption in the authentication protocol of the illustrative embodiment is that application of the one-time pad requires only an XOR operation, which is a "lightweight" computational process suitable for implementation in a low-cost RFID tag. Also, as mentioned previously, updating tag values via one-time padding also provides information-theoretic security.

As explained above, tag values are updated using pads from multiple authentication sessions. Let $\kappa$ be some value stored in a tag, i.e., $\kappa \in \{\alpha_i\} \cup \{\beta_i\} \cup \{\gamma_i\}$. Let m be a parameter governing the resistance of the protocol to adversarial eavesdropping.

For every value $\kappa$, we maintain in the tag a vector $\Delta_\kappa = \{\delta_\kappa^{(1)}, \delta_\kappa^{(2)}, \ldots, \delta_\kappa^{(m)}\}$ of one-time pads. The pad $\delta_\kappa^{(1)}$, which we refer to as the live pad, is used to update the tag value $\kappa$. In particular, to update $\kappa$, the tag computes $\kappa \leftarrow \kappa \oplus \delta_\kappa^{(1)}$.

Prior to update of $\kappa$, the pads in $\Delta_\kappa$ are updated with new padding material received from the verifier. Let $\tilde{\Delta}_\kappa = \{\tilde{\delta}_\kappa^{(1)}, \tilde{\delta}_\kappa^{(2)}, \ldots, \tilde{\delta}_\kappa^{(m)}\}$ be a vector of newly generated one-time pads received from the verifier in the protocol. The vector $\Delta_\kappa$ is updated as follows. The live pad $\tilde{\delta}_\kappa^{(1)}$ is discarded, assuming that it has already been used in a previous update process. The indices of all other pads in $\Delta_\kappa$ are then shifted downward, i.e., in increasing index order, we set $\delta_\kappa^{(i)} = \delta_\kappa^{(i+1)}$ for $1 \leq i \leq n-1$. We set $\delta_\kappa^{(m)} = 0^l$, i.e., we fill the last, missing element in the vector with a '0' bitstring, although this last vector element could be handled in other ways, for example, the discarded, previously live pad may be rotated to the last position in the vector. Finally, we "overlay" the newly received vector $\tilde{\Delta}_\kappa$ on the existing vector $\Delta_\kappa$, by performing an element-wise XOR. That is, we let $\delta_\kappa^{(i)} = \delta_\kappa^{(i)} \oplus \tilde{\delta}_\kappa^{(i)}$. The particular ordering of the updates of vector $\Delta_\kappa$ and $\kappa$ may be reversed in alternative embodiments.

As a result of the above-described manipulations, the vector $\Delta_\kappa$ comprises a set of m one-time pads with decreasing levels of backward secrecy. After the completion of a session, the live pad $\delta_\kappa^{(1)}$, for instance, comprises the XOR of independent pads from the previous m successfully completed sessions. At the other end of the spectrum, the value $\delta_\kappa^{(m)}$ comprises only a single pad, namely the one just transmitted in the most recent session. This is why we update $\kappa$ using the strongest pad in $\Delta_\kappa$, namely the live one, and then strengthen and "promote" the other pads in $\Delta_\kappa$ by overlaying a vector of newly transmitted ones.

This approach provides information-theoretic security guarantees. In particular, an adversary that has knowledge of only m−1 of the last m pad transmissions from the verifier has no knowledge at all about $\delta_\kappa^{(1)}$. Thus, when the live pad is employed to update $\kappa$, such an adversary learns no information whatsoever about the new value of $\kappa$.

A potential drawback to this approach is that the transmission cost to maintain pads is lm bits per session. In other words, the communication costs in this protocol are linear in the length l of individual tag values and in the number m of consecutive authentication sessions relative to which we wish to achieve security against the adversary. Given that there are 3k tag values in the illustrative embodiment, namely $\alpha_i$, $\beta_i$, and $\gamma_i$ for i=1 to k, this translates into a total cost of 3klm. This cost is not insignificant, but still permits a wide range of practical parameterizations, as will be discussed elsewhere herein.

FIG. 3 illustrates in greater detail an example authentication protocol as carried out between a given one of the tags 102 and reader 104 or other verifier in the RFID system 100 in the illustrative embodiment of the invention. As shown in the figure, this example protocol includes a total of four information flows, with two flows from the tag to the verifier and two flows from the verifier to the tag. It is to be appreciated, however, that the invention does not require the particular flows shown in the figure, the particular processing operations associated with these flows, or the particular ordering of flows or ordering of processing operations within a given flow.

We use the notation update($\Delta_\kappa, \tilde{\Delta}_\kappa$) to denote the function that updates $\Delta_\kappa$ and "overlays" it with $\tilde{\Delta}_\kappa$. We let pad($\kappa, \Delta_\kappa$) denote the update of $\kappa$ using the live pad $\delta_\kappa^{(1)}$, again, the one with the strongest backward security. For brevity of notation, we let ABC denote the set of values $\{\alpha_i\} \cup \{\beta_i\} \cup \{\gamma_i\}$, and $\Delta_{ABC}$ denote padding vectors for all values $\kappa$ in the set ABC.

As indicated above, k denotes the number of pseudonyms stored in a given tag, and m denotes the number of authentication sessions over which one-time pads are constructed. The higher the value of m, the stronger the eavesdropping-resistance of the system. For visual clarity in the protocol figure, we omit variable ranges and tag subscripts on variables for values. The variables i and j, however, always span the ranges $\{1, 2, \ldots, k\}$ and $\{1, 2, \ldots, m\}$, respectively. The notation $\epsilon_R$ denotes uniform random selection, although pseudorandom selection may be used in other embodiments. In case of a message-delivery failure, we assume the input of a special symbol $\perp$, leading to protocol termination. We assume initialization of all entities by a trusted party, who generates a set ABC for every tag and dispenses this to both the tag and the verifier. All counters are initialized at zero.

The tag initially computes $d \leftarrow (c \bmod k)+1$, where c denotes a counter value, computes $\alpha' \leftarrow \alpha_d$, and then sends $\alpha'$ to the verifier. The verifier determines if $\alpha'$ is a valid $\alpha_i$ for some tag $T_x$, and if so sets tag←x, $\beta' \leftarrow \beta_i$, and $\gamma \leftarrow \gamma_i$, marks $\alpha_i$ as invalid for $T_x$, and sends $\beta'$ to the tag. Otherwise, the verifier outputs a "reject" message and aborts the protocol.

Upon receipt of $\beta'$ from the verifier, the tag determines if $\beta' \neq \beta_d$, and if so outputs a "reject" message and aborts the protocol. Otherwise, the tag sets $\gamma' \leftarrow \gamma_d$, and sends $\gamma'$ to the verifier.

Upon receipt of $\gamma'$ from the verifier, the verifier determines if $\gamma' \neq \gamma$ or $\gamma' = \perp$, and if so outputs a "reject" message and aborts the protocol. Otherwise, the verifier determines $\widetilde{\Delta}_{ABC} \in_R \{\{0, 1\}^l\}^{3km}$, and sends the result to the tag. The verifier also outputs an "accept" message for the given tag, and performs the operations $\{update(\Delta_\kappa, \widetilde{\Delta}_\kappa)\}_{\kappa \in ABC}$ and $\{\kappa \leftarrow pad(\kappa, \Delta_\kappa)\}_{\kappa \in ABC}$, as shown.

Responsive to receipt of $\widetilde{\Delta}_{ABC}$ from the verifier, the tag completes the authentication protocol session by performing the operations $\{update(\Delta_\kappa, \widetilde{\Delta}_\kappa)\}_{\kappa \in ABC}$, $\{\kappa \leftarrow pad(\kappa, \Delta_\kappa)\}_{\kappa \in ABC}$, and $c \leftarrow c+1$.

Generally, although not explicitly indicated as such in the figure, the counter increment operation $c \leftarrow c+1$ should be performed even if the protocol is aborted. That is, it is preferred that this counter be incremented after performance of any of the above-mentioned abort operations.

As indicated above, the ordering of processing operations in a given flow may be varied. For example, the order in which the update and pad operations are performed by the tag and verifier may be reversed in alternative embodiments. Also, other types of refresh data may be transmitted from the verifier to the tag in the fourth flow of the protocol.

It should be noted that this embodiment assumes no collisions among pseudonyms. Such a property can be enforced during tag initialization and updates with only a very slight skew from a uniform random distribution over pseudonyms.

Although suitable for implementation in low-cost RFID tags, the above-described authentication protocol can be modified in order to provide further reductions in complexity while still retaining important properties.

For example, one or both of the values $\beta_i$ and $\gamma_i$ may be made relatively short, on the order of about twenty bits each, without significantly undermining the security of the protocol. If both were made twenty bits each, then an adversary would have roughly a one-in-a-million chance of defeating the authentication protocol in a single try.

The tag pseudonyms, corresponding in the illustrative embodiment to the values $\alpha_i$, should be considerably longer to permit unique identification of tags and to avoid pseudonym collisions. It is believed that 100-bit $\alpha_i$ values would suffice for this purpose in many practical cases, although longer or shorter values could of course be used.

The verifier may be configured to select different pseudonyms if a pseudonym collision occurs in the naming of a new tag. Such a naming strategy would permit a reduction in the lengths of $\alpha_i$ values to around 80 bits for substantially the same level of security as that provided using 100-bit $\alpha_i$ values.

Very large values of m or k may not be practical in many implementations, due to the limited computational and storage capabilities of typical RFID tags. In order to minimize the complexity of the authentication protocol, it may be desirable in a given practical implementation to select values such as m=0 or 1 and k=4 or 5, where an m=0 value indicates an arrangement with no updates of the stored pseudonyms via refresh.

Various truncated versions of the authentication protocol shown in FIG. 3 may also be implemented. For example, one possible alternative authentication protocol may exclude the fourth flow in the FIG. 3 protocol. In other words, the ABC values in the tag may remain the same throughout its lifetime. A much-reduced variant may include only the first flow in the FIG. 3 protocol. This would mean that a tag cycles through a static set of pseudonyms. In such an arrangement, a suitable "throttling" of query-response rate should also be provided, through hardware-based delays, rate specification or other limitation, as previously noted herein. This example single-flow approach offers better privacy assurances than a conventional RFID system using a single static identifier per tag, but may not provide the desired level of protection against tag cloning. Another similarly useful truncation is one in which multiple pseudonyms $\{\alpha_i\}$ are stored in a tag, but only a single value $\beta$ and single value $\gamma$ are provided for common use with all pseudonyms.

These and other similar embodiments of the invention have the additional advantage of being configurable for backward compatibility with conventional RFID systems using a single static identifier per tag. In other words, the reader need not be aware that a given received tag identifier is in fact a pseudonym. Such awareness may be provided, for example, only in a back-end application program or other non-reader entity that serves as a verifier within the system. An implementation of this type thus does not require any hardware, software or firmware modifications in the reader itself.

Another alternative embodiment of the invention may involve using just a single pseudonym per tag at any given time, but in conjunction with challenge-response and pseudonym update features similar to those of the FIG. 3 protocol. This variant thus provides authenticated rotation of a single pseudonym stored in the tag, and as a result of the rotation is considered to associate multiple pseudonyms with the tag. Such a variant may be particularly useful, for example, in applications in which consumers are borrowing RFID-tagged books from libraries, renting RFID-tagged videos, or undertaking similar activities. Although this variant does not prevent physical tracking, it does prevent the larger problem of passersby being scanned to determine what books or videos they are carrying.

An authentication protocol in accordance with the present invention may be incorporated into an otherwise conventional electronic product code (EPC) system of a type specified by the MIT AutoID center. See, for example, the above-cited S. E. Sarma reference, and D. L. Brock, "The electronic product code (EPC): A naming scheme for objects," Technical Report MIT-AUTOID-WH-002, MIT Auto ID Center, 2001, both of which are incorporated by reference herein. An EPC comprises 96 bits, sequentially partitioned as follows: (1) an 8-bit header; (2) a 28-bit "EPC-manager" code, designating the organization that owns the tag; (3) a 24-bit "object-manager" code, designating the class of object as determined by the EPC manager; and (4) a 36-bit serial number that uniquely identifies the object.

The EPC serial numbers could be replaced with pseudonyms configured to support an authentication protocol of the type described herein. This would provide privacy at the level of the serial numbers, in a manner compatible with the existing standards, although it would not prevent identification of the general types of objects carried by individual consumers. Of course, additional privacy could be provided by utilizing pseudonyms in one or more additional EPC fields, such as the object-manager code.

Although the illustrative embodiment is described with reference to a single verifier, a given RFID system in accordance with the invention can include multiple such verifiers, arranged in a centralized configuration, distributed configuration or combinations of such configurations. Thus, for example, Shop X and Shop Y can each issue their own RFID tags. Without explicit cooperation, neither will be able to track or otherwise interact with the tags of the other. Shop X will fail to recognize the pseudonyms of the tags issued by Shop Y, and may simply ignore them, and vice versa.

The verifier in the FIG. 3 protocol may be configured to store, for a given tag $T_x$, an associated static identifier $id_x$ and a counter value on the number of successful authentications for the tag. The $\alpha_i$ values for $T_x$ may be obtained, for example, by encrypting $id_x \| z_x$ under a master symmetric key $K_\alpha$ for the verifier, where $z_x$ is a counter value on the number of pseudonyms issued for the tag $T_x$. When the verifier receives a pseudonym, it may decrypt it using $K_\alpha$ to obtain the corresponding static identifier $id_x$. The $\beta_i$ and $\gamma_i$ values may be similarly derived. For example, the verifier might compute $\beta_i$ and $\gamma_i$ as the encryption of $\alpha_i$ under master secret keys $K_{62}$ and $K_\gamma$, respectively.

It should be noted that the use of multiple flows in the FIG. 3 authentication protocol, while advantageously preventing cloning attacks, may in certain applications diminish the effectiveness with which RFID tags may be read. In such applications, the number of flows may be reduced by utilizing one of the protocol variants described herein, or other straightforward adjustments may be made in order to minimize any performance degradation.

A number of issues relating to denial-of-service and service failures in the above-described authentication protocol will now be addressed.

When an identifier $\alpha_i$ for a given tag is submitted in a protocol session, it is subsequently treated as invalid for the tag, except in the unlikely case that it recurs at random in a later refresh. This feature of the FIG. 3 protocol helps to prevent cloning in that once an attacker harvests the corresponding $\beta_i$ and $\gamma_i$ values for a tag, they are no longer valid for future sessions. Thus the attacker cannot use these values to clone the tag, except in the unlikely case noted above.

On the other hand, invalidation of $\alpha_i$ values opens up the possibility of a denial-of-service attack. An attacker that is able to harvest and submit all such values for a given tag to the verifier may render the tag inoperable. However, the use of multiple pseudonyms counteracts such an attack, by making it more difficult for an attacker to harvest and maliciously submit all valid $\alpha_i$ values.

It is also possible that denial-of-service attacks may be directed to the refresh process. More specifically, by tampering with data in the fourth flow of the FIG. 3 protocol, an adversary can render a tag incapable of authenticating successfully, and thereby disable it. Although such attacks are theoretically possible, it is expected that an adversary would be more likely to choose simpler means for achieving the same result, such as rendering the tag inoperable through physical damage from an electromagnetic source.

In addition, denial-of-service attacks on small numbers of tags are not expected to be problematic, since RFID systems are generally configured to tolerate failures of individual tags through wear and tear in the course of ordinary use.

It should be noted that the loop-around feature in the rotation through pseudonyms in the FIG. 3 protocol advantageously prevents service failures that might otherwise result from benign reading of tags. In normal use, tags are often scanned by readers that are not associated with their designated verifier. For example, as it scans tags on its premises, Shop Y may inadvertently read tags of patrons carrying objects from Shop X. Without indefinitely permissible rotation through pseudonyms, or a similar mechanism, such benign scanning might cause a tag to exhaust quickly a given set of valid pseudonyms.

In the FIG. 3 protocol, the tag switches to a new pseudonym every time the tag is queried by a reader. A number of additional variants on the FIG. 3 protocol, dealing with the manner in which a given tag rotates through pseudonyms, will now be described in detail.

A first of these variants uses per-scan pseudonym specification, in which a reader or other verifier at the beginning of the protocol specifies an index i identifying which pseudonym $\alpha_i$ it would like the tag to transmit. This does not provide additional protection against an active adversary, that is, one that aims to gather information by surreptitiously scanning tags. However, it does provide additional protection against passive adversaries eavesdropping on tag identifier information that may be broadcast by a reader in conjunction with performance of a singulation protocol. It also has the advantage of eliminating the need for tags to maintain state information, such as a counter indicating which pseudonym to transmit.

Consider a simple example in which each tag contains two pseudonyms, denoted $\alpha_1$ and $\alpha_2$, and in which the challenge-response aspects of the authentication protocol are not employed. Assume an adversary eavesdrops on the RFID readers at Warehouse A and Retailer B. Suppose the goal of the adversary is to learn whether there is a flow of items from A to B, and ideally the size of such a flow. If the A readers always direct tags to transmit pseudonym $\alpha_1$ and the B readers always direct tags to transmit pseudonym $\alpha_2$, then the eavesdropper cannot tell whether tags originating at A are in fact scanned at B, and will fail in the stated goal.

In fact, in this and related scenarios, per-scan pseudonym specification can provide stronger guarantees than simple pseudonym rotation. Consider an arrangement without per-scan pseudonym specification, in which the tags do not include a pseudonym refresh capability, but instead rotate through a small, static set of pseudonyms. If Warehouse A scans tags frequently, then the adversary may be able to harvest all tag pseudonyms $\alpha_1, \alpha_2, \ldots, \alpha_k$, for example, by eavesdropping. The adversary may not be able to link pseudonyms, i.e., may not be able to determine which pseudonyms reside on the same tag. The adversary will, however, be able to determine whether tags are shipped from A to B, as it will be able to recognize identifiers originating from A.

It is possible to treat the full concatenated set of pseudonyms $\alpha_1 \| \alpha_2 \| \ldots \| \alpha_k$ as a single, long identifier, with per-scan pseudonym specification in this case involving selective reading of portions of a tag identifier.

In such an arrangement, per-scan pseudonym specification may be performed in a manner that is backward compatible with existing tree-walking singulation protocols, thus requiring no changes to the tags, but only to the reader. Assume a given tag is expressed as a concatenated pair of l-bit pseudonyms, i.e., $\alpha = \alpha_1 \| \alpha_2$. Returning to the previous example, Warehouse A might extract identifier $\alpha_1$, from tags by executing the tree-walking protocol so as to traverse only half the depth of the corresponding identifier tree, i.e., down to depth l. Retailer B might extract identifier $\alpha_2$ by singulating on only the lower half of the tree, i.e., at depth greater than l. Singulation on the lower half of the tree is supported in the above-noted Auto-ID standards by the availability of a pointer to specify a starting position in an identifier for commands involving string matching. It is also possible, by way of example, that $\alpha_1$ and $\alpha_2$ may overlap slightly, resulting in slight leakage of linkage data, or that $\alpha_1$ and $\alpha_2$ may represent tag data other than serial numbers.

A second of the above-noted pseudonym rotation variants involves reader setting of pseudonym counters. In this variant, rather than specifying the pseudonym to be transmitted by a tag, a reader might explicitly set the pseudonym counter in a tag. For example, again assuming a simple two-pseudonym case, tags may be configured to contain a single, write-once bit b, which is set to b=0 by default. When b=0, the tag transmits pseudonym $\alpha_1$. When b=1, the tag transmits pseudonym $\alpha_2$. To enforce privacy against a passive eavesdropper, then, Warehouse A may simply set b=1 on the tags of items it is about to ship. The consequence will be that A reads $\alpha_1$, while B reads $\alpha_2$ for any given tag.

An advantage of this second variant over per-scan pseudonym specification is that it eliminates the need for A and B to coordinate the determination of which pseudonyms they will read, and B need not even be aware of the use of this technique. Such an arrangement may be particularly useful in cases where tags have multiple pseudonyms that are read by multiple entities. Of course, b may be a more complex data structure, such as a counter, and may be re-writeable, rather than just write-once.

A third example pseudonym rotation variant incorporates timing information into the determination of when to change pseudonyms. For example, a tag may increment its pseudonym counter only if a certain minimum amount of time has elapsed since the previous reading has taken place. This timing may be inexpensively enforced using the same or similar hardware mechanisms used to enforce limitations on query-response rate. Suppose that Warehouse A scans items frequently on its premises, but items are not scanned for some time while in transit. Timing-based pseudonym changes may be used to ensure that Warehouse A always sees the same pseudonym for a given tag. The tag counter will be incremented, however, when the tag is scanned by Retailer B, with the result that Retailer B sees a new pseudonym.

This approach has the same advantage as per-scan pseudonym specification of not requiring tag state storage, apart from simple and inexpensive hardware timing mechanisms of a type well known in the art, such as timing mechanisms based on capacitor discharge rates. At the same time, it has the advantageous feature, like reader setting of pseudonym counters, of not requiring coordination by entities of which pseudonyms they will scan, as pseudonym changes are automatically executed by the tag. Indeed, for this reason, timing approaches to pseudonym changes not only provide a useful defense against passive adversaries, but also against active adversaries. Additionally, timing information may be combined with information about the number of times a tag has been scanned in order to create more sophisticated policies governing the changing of pseudonyms. For example, a tag might implement a policy requiring rotation to the next pseudonym only after: (i) being scanned ten times; or (ii) after not having been scanned for a particular period of time, such as one hour. With regard to element (ii), only a single rotation need be provided in the event of an uninterrupted series of two or more such no-scan periods.

It is to be appreciated that the techniques of the present invention may be utilized in conjunction with existing cryptographic functionality that may be available with a given RFID tag. For example, an RFID tag might execute one or several rounds of a cipher on every query, storing partial results and releasing output only when all rounds of the cipher have been fully computed. The resource requirements of cipher implementation would then be significantly reduced.

As a more particular example, the present invention may be implemented using tags which incorporate a pseudorandom number generator. Let $f_{\kappa_x}(i)$ represent a suitably long output of a pseudorandom number generator for index i, where $\kappa_x$ is a secret, random seed unique to tag $T_x$. In this case, an RFID tag could of course generate its own pseudonyms $\alpha_1=f(1)$, $\alpha_2=f(2), \ldots, \alpha_k=f(k)$, rather than storing them. The tag could generate β and γ values in an analogous manner. In principle, then, there need be no bound on k. It should be noted that, in alternative implementations, the seed $\kappa_x$ need not be unique to $T_x$, but could instead be associated with multiple RFID tags.

If the verifier and tag are properly synchronized, then they may attempt to maintain a common counter $d_x$ unique to $T_x$, and may share the seed $\kappa_x$. To determine which tag is associated with a given incoming value $\alpha$, the verifier could simply perform a lookup in a list of current $\alpha$ values for all tags, namely $\{f_{\kappa_x}(d_x)\}$.

Desynchronization of the tag and verifier, however, is likely to be a concern in practical applications, and might provide a mechanism for denial-of-service attacks. One possible approach to preventing desynchronization would be for the verifier to maintain a list not just of current $\alpha$ values, but also of values from several future time increments. An advantage of such an arrangement is that is does not leak any counter values. Counter values themselves may serve as identifiers permitting privacy infringement.

A more comprehensive approach would involve establishing a bound of moderate size on k, e.g., k=100. Given storage of a full set of k pseudonyms for each tag, the verifier could feasibly search through the full list of possible pseudonyms. Upon successful verifier-to-tag authentication, refresh would be straightforward. Suppose that for a counter value d, an RFID tag computes $\alpha_d=f(bk+d)$, where b in this context is a "base" value. The last flow from the verifier might simply be an acknowledgment message indicating that the base value b should be incremented.

It should be noted that registration of a tag $T_x$ by a verifier or transfer of ownership to a new verifier may require transfer of $\kappa_x$ and preferably also transfer of counter values. As mentioned previously, these values might be transferred with the aid of an optically or physically enabled contact channel, or using any other suitable information transfer mechanism. For example, $\kappa_x$ might be printed in scannable optical form on the RFID tag. On receiving $\kappa_x$, or after some other appropriate form of authentication, a tag may release its current counter value. A new owner might presumably also provide a new seed value $\kappa_x$ to a tag through a process involving authentication via the old seed value.

The function f here may alternatively be a stream cipher, or other type of function, and need not be directly indexable. In implementing rotation through pseudonyms, a tag may only store state information permitting computation of $f(bk+0)$.

With regard to distribution of pseudonyms, it should be noted that conventional key management techniques may be adapted for use in distributing pseudonyms efficiently to tags and verifiers. For example, pseudonyms might simply be determined and installed in tags at the time of tag manufacture. As another example, a master key may be provided for the pseudonyms of a particular tag, with the master key being readable via an optically or physically enabled contact channel in a known manner. Any other suitable information transfer mechanism could also be used.

As indicated previously, the invention is not limited with regard to the particular configuration of the pseudonyms, or the manner of their generation. It is possible, for example, to utilize a portion of an otherwise conventional EPC code or other tag identifier as a set of pseudonyms. More specifically, an EPC code contains EPC-manager and object-manager codes, as well as a serial number. One possible way to implement an EPC-based pseudonym system in accordance with the invention is to ignore the EPC-manager and object-manager codes, and to treat the serial number as a set of pseudonyms.

Again, it should be emphasized that the particular authentication protocols and other cryptographic techniques described herein are provided by way of illustration, and should not be construed as limiting the present invention to any specific embodiment or group of embodiments.

For example, the invention does not require any particular configuration of tags, readers, verifiers or other RFID system elements, such as those shown in FIGS. 1 and 2, nor does it require the particular set of flows and associated processing operations described in conjunction with the FIG. 3 authentication protocol. Alternative embodiments thus need not incorporate any particular aspect of the arrangements shown in the figures or otherwise described in conjunction therewith.

In addition, the various simplifying assumptions made above in the course of describing the illustrative embodiments should also be viewed as exemplary rather than as requirements or limitations of the invention, and one or more of such assumptions need not apply in alternative embodiments of the invention.

These and numerous other alternative embodiments within the scope of the appended claims will be readily apparent to those skilled in the art.

What is claimed is:

1. A method for use in an RFID system comprising at least one RFID device and at least one reader which communicates with the RFID device, the method comprising the steps of:
    associating a plurality of pseudonyms with the RFID device; and
    transmitting from the RFID device different ones of the pseudonyms in response to different reader queries of the RFID device;
    wherein an authorized verifier is able to determine that the different transmitted pseudonyms are associated with the same RFID device;
    wherein the verifier authenticates itself to the RFID device by releasing to the RFID device an authentication value $\beta_i$ unique to a given pseudonym $\alpha_i$ transmitted by the RFID device;
    wherein the RFID device authenticates itself to the verifier by releasing to the verifier an authentication value $\gamma_i$ unique to the given pseudonym $\alpha_i$ transmitted by the RFID device; and
    wherein at least one of the values $\alpha_i$, $\beta_i$ and $\gamma_i$ is selected from a corresponding set of such values that is stored in the RFID device and updated using one-time pads transmitted by the verifier to the RFID device over multiple authentication sessions carried out between the verifier and the RFID device.

2. The method of claim 1 wherein the transmitted pseudonyms are authenticated by the reader.

3. The method of claim 1 wherein the transmitted pseudonyms are authenticated by a verifier other than the reader.

4. The method of claim 1 wherein the RFID device is configured to authenticate itself to a verifier only after the verifier has authenticated itself to the RFID device.

5. The method of claim 1 wherein one or more of the pseudonyms each comprise an identifier of the RFID device.

6. The method of claim 1 wherein the pseudonyms are stored in the RFID device as an ordered list of pseudonyms, the method further including the steps of designating a particular one of the pseudonyms as a current pseudonym and, in response to a given reader query, transmitting the current pseudonym, wherein over a plurality of reader queries the pseudonym designated as the current pseudonym periodically cycles through the list of pseudonyms.

7. The method of claim 6 wherein after the current pseudonym is transmitted by the RFID device responsive to the given query, a different one of the plurality of stored pseudonyms is designated as the current pseudonym to be transmitted responsive to a subsequent query.

8. The method of claim 1 wherein one or more of the pseudonyms are generated on an as-needed basis within the RFID device.

9. The method of claim 1 wherein one or more of the pseudonyms are generated externally to the RFID device.

10. The method of claim 1 further including the step of limiting a rate at which the RFID device is permitted to transmit pseudonyms responsive to reader queries.

11. The method of claim 1 further including the step of periodically altering one or more of the plurality of pseudonyms.

12. The method of claim 11 wherein the altering step is implemented responsive to receipt of refresh information in the RFID device from a verifier.

13. The method of claim 12 wherein the refresh information comprises one or more refresh values transmitted from the verifier to the RFID device after mutual authentication of the RFID device and the verifier.

14. A method for use in an RFID system comprising at least one RFID device and at least one reader which communicates with the RFID device, the method comprising the steps of:
    associating a plurality of pseudonyms with the RFID device; and
    transmitting from the RFID device different ones of the pseudonyms in response to different reader queries of the RFID device;
    wherein an authorized verifier is able to determine that the different transmitted pseudonyms are associated with the same RFID device; and
    wherein for a given value $\kappa$ utilized in the RFID device, a vector $\Delta_\kappa = \{\delta_\kappa^{(1)}, \delta_\kappa^{(2)}, \ldots, \delta_\kappa^{(m)}\}$ of one-time pads is maintained in the RFID device, wherein the one-time pad $\delta_\kappa^{(1)}$ is designated as a live pad and is used by the RFID device to update the value $\kappa$, where m denotes a number of authentication sessions over which one-time pads are constructed.

15. The method of claim 14 wherein the value $\kappa$ is updated by computing $\kappa \leftarrow \kappa \oplus \delta_K^{(1)}$.

16. The method of claim 14 wherein in conjunction with updating the value $\kappa$, the vector $\Delta_\kappa$ is updated utilizing a vector $\tilde{\Delta}_\kappa = \{\tilde{\delta}_\kappa^{(1)}, \tilde{\delta}_\kappa^{(2)}, \ldots, \tilde{\delta}_\kappa^{(m)}\}$ of one-time pads, the vector $\Delta_\kappa$ being updated by discarding the previous live pad $\tilde{\delta}_\kappa^{(1)}$, setting $\delta_\kappa^{(i)} = \delta_\kappa^{(i+1)}$ for $1 \leq i \leq n-1$, setting $\delta_\kappa^{(m)} = 0^l$, and performing an element-wise exclusive-or of $\Delta_\kappa$ and $\tilde{\Delta}_\kappa$ by computing $\delta_\kappa^{(i)} = \delta_\kappa^{(i)} \oplus \tilde{\delta}_\kappa^{(i)}$, such that the updated vector $\Delta_\kappa$ comprises a set of m one-time pads with decreasing levels of backward secrecy.

17. The method of claim 1 wherein a verifier of the system is configured to store for a given RFID device $T_x$ a static identifier $id_x$ corresponding to at least one pseudonym of $T_x$.

18. A method for use in an RFID system comprising at least one RFID device and at least one reader which communicates with the RFID device, the method comprising the steps of:
    associating a plurality of pseudonyms with the RFID device; and
    transmitting from the RFID device different ones of the pseudonyms in response to different reader queries of the RFID device;
    wherein an authorized verifier is able to determine that the different transmitted pseudonyms are associated with the same RFID device;

wherein the verifier is configured to store for a given RFID device $T_x$ a static identifier $id_x$ corresponding to at least one pseudonym of $T_x$; and wherein the pseudonyms for $T_x$ are obtained by encrypting $id_x \| Z_x$ under a symmetric key $K_\alpha$ for the verifier, where $Z_x$ comprises a pseudonym counter.

19. The method of claim 18 wherein when the verifier receives a pseudonym from the RFID device, the verifier decrypts the pseudonym using $K_\alpha$ to obtain the corresponding static identifier $id_x$.

20. The method of claim 1 wherein a verifier of the system in conjunction with an authentication session with the RFID device specifies a value identifying a particular pseudonym to be transmitted by the RFID device.

21. The method of claim 1 wherein the RFID device determines which of the plurality of pseudonyms to transmit responsive to a given reader query based at least in part on timing information.

22. The method of claim 1 wherein the RFID device incorporates a pseudorandom number generator, where $f_{\kappa_x}(i)$ represents an output of the pseudorandom number generator for index i, where $\kappa_x$ is a seed associated with the RFID device.

23. The method of claim 22 wherein the RFID device generates the plurality of pseudonyms as pseudonyms $\alpha_1 = f(1), \alpha_2 = f(2), \ldots, \alpha_k = f(k)$.

24. A method for use in an RFID system comprising at least one RFID device and at least one reader which communicates with the RFID device, the method comprising the steps of:

associating a plurality of pseudonyms with the RFID device; and transmitting from the RFID device different ones of the pseudonyms in response to different reader queries of the RFID device;

wherein an authorized verifier is able to determine that the different transmitted pseudonyms are associated with the same RFID device;

wherein the RFID device incorporates a pseudorandom number generator, where $f_{\kappa_x}(i)$ represents an output of the pseudorandom number generator for index i, where $\kappa_x$ is a seed associated with the RFID device;

wherein the RFID device and the verifier attempt to maintain a common counter $d_x$ unique to the RFID device, and share the seed $K_x$; and wherein for a given counter value d, the RFID device computes a given one of the pseudonyms as a function of both a base value b and the given counter value d, and the verifier provides a subsequent instruction to the RFID device to increment the base value b.

25. The method of claim 24 wherein in order to determine which RFID device is associated with a given incoming value $\alpha$, the verifier performs a lookup in a list $\{f_{\kappa_x}(d_x)\}$ of current $\alpha$ values for a plurality of RFID devices.

26. The method of claim 24 wherein for the given counter value d, the RFID device computes the given pseudonym as $\alpha_d = f(bk+d)$, where $\epsilon$ denotes a number of pseudonyms associated with the RFID device.

27. An apparatus for use in an RFID system, the apparatus comprising:

an RFID device having a plurality of pseudonyms associated therewith and being operative to communicate with one or more readers of the system;

the RFID device being further operative to transmit different ones of the pseudonyms in response to different reader queries of the RFID device;

wherein an authorized verifier is able to determine that the different transmitted pseudonyms are associated with the same RFID device;

wherein the verifier authenticates itself to the RFID device by releasing to the RFID device an authentication value $\beta_i$ unique to a given pseudonym $\alpha_i$ transmitted by the RFID device;

wherein the RFID device authenticates itself to the verifier by releasing to the verifier an authentication value $\gamma_i$ unique to the given pseudonym $\alpha_i$ transmitted by the RFID device; and wherein at least one of the values $\alpha_i$, $\beta_i$ and $\gamma_i$ is selected from a corresponding set of such values that is stored in the RFID device and updated using one-time pads transmitted by the verifier to the RFID device over multiple authentication sessions carried out between the verifier and the RFID device.

28. An RFID system comprising:

a plurality of RFID devices; and a plurality of readers which communicate with at least a subset of the RFID devices;

wherein a plurality of pseudonyms are associated with a given one of the RFID devices, the given RFID device being configurable to transmit different ones of the pseudonyms in response to different reader queries of the given RFID device;

wherein an authorized verifier is able to determine that the different transmitted pseudonyms are associated with the same RFID device;

wherein the verifier authenticates itself to the given RFID device by releasing to the given RFID device an authentication value $\beta_i$ unique to a given pseudonym $\alpha_i$ transmitted by the given RFID device;

wherein the given RFID device authenticates itself to the verifier by releasing to the verifier an authentication value $\gamma_i$ unique to the given pseudonym $\alpha_i$ transmitted by the given RFID device; and wherein at least one of the values $\alpha_i$, $\beta_i$ and $\gamma_i$ is selected from a corresponding set of such values that is stored in the given RFID device and updated using one-time pads transmitted by the verifier to the given RFID device over multiple authentication sessions carried out between the verifier and the given RFID device.

29. An apparatus for use in an RFID system, the apparatus comprising:

a reader which communicates with one or more RFID devices;

wherein a plurality of pseudonyms are associated with a given one of the RFID devices, the given RFID device transmitting different ones of the pseudonyms in response to different reader queries of the given RFID device;

wherein an authorized verifier is able to determine that the different transmitted pseudonyms are associated with the same RFID device;

wherein the verifier authenticates itself to the given RFID device by releasing to the given RFID device an authentication value $\beta_i$ unique to a given pseudonym $\alpha_i$ transmitted by the given RFID device;

wherein the given RFID device authenticates itself to the verifier by releasing to the verifier an authentication value $\gamma_i$ unique to the given pseudonym $\alpha_i$ transmitted by the given RFID device; and wherein at least one of the values $\alpha_i$, $\beta_i$ and $\gamma_i$ is selected from a corresponding set of such values that is stored in the given RFID device and updated using one-time pads transmitted by the verifier to the given RFID device over multiple authentication sessions carried out between the verifier and the given RFID device.

30. A method for use in a system comprising at least one device and at least one reader which communicates with the device, the method comprising the steps of:
    associating a plurality of pseudonyms with the device; and
    transmitting from the device different ones of the pseudonyms in response to different reader queries of the device;
    wherein the pseudonyms are determined utilizing an updateable set of one or more one-time pads maintained in the device;
    wherein the device comprises an RFID device;
    wherein a verifier authenticates itself to the RFID device by releasing to the RFID device an authentication value $\beta_i$ unique to a given pseudonym $\alpha_i$ transmitted by the RFID device;
    wherein the RFID device authenticates itself to the verifier by releasing to the verifier an authentication value $\gamma_i$ unique to the given pseudonym $\alpha_i$ transmitted by the RFID device; and
    wherein at least one of the values $\alpha_i$, $\beta_i$ and $\gamma_i$ is selected from a corresponding set of such values that is stored in the RFID device and updated using one-time pads transmitted by the verifier to the RFID device over multiple authentication sessions carried out between the verifier and the RFID device.

31. The method of claim 1 wherein one or more of the pseudonyms each comprise a portion of an identifier of the RFID device.

\* \* \* \* \*

UNITED STATES PATENT AND TRADEMARK OFFICE
CERTIFICATE OF CORRECTION

PATENT NO. : 7,532,104 B2
APPLICATION NO. : 10/782309
DATED : May 12, 2009
INVENTOR(S) : Ari Juels It is certified that error appears in the above-identified patent and that said Letters Patent is hereby corrected as shown below:

Claim 18, col. 17, line 6 delete "," after $Z_x$

Claim 24, col. 17, line 47 delete "subseciuent" and insert --subsequent--

Claim 26, col. 17, line 55, delete "∈" and insert --$k$--

Signed and Sealed this

Twenty-eighth Day of July, 2009

JOHN DOLL
*Acting Director of the United States Patent and Trademark Office*